United States Patent
Park et al.

(10) Patent No.: US 10,519,062 B2
(45) Date of Patent: Dec. 31, 2019

(54) MANUFACTURING METHOD FOR CAMERA WINDOW HAVING DISTINCTIVE PATTERN AND CAMERA WINDOW HAVING THE DISTINCTIVE PATTERN

(71) Applicant: UTI INC., Yesan-gun (Chungcheongnam-do) (KR)

(72) Inventors: Deok Young Park, Suwon-si (KR); Jae Young Hwang, Suwon-si (KR); Hak Chul Kim, Yesan-eup (KR); Tea Joo Ha, Yesan-eup (KR)

(73) Assignee: UTI, INC. (KR)

( * ) Notice: Subject to any disclaimer, the term of this patent is extended or adjusted under 35 U.S.C. 154(b) by 0 days.

(21) Appl. No.: 15/489,848

(22) Filed: Apr. 18, 2017

(65) Prior Publication Data
US 2017/0297952 A1   Oct. 19, 2017

(30) Foreign Application Priority Data

Apr. 19, 2016 (KR) ........................ 10-2016-0047803

(51) Int. Cl.
| C03C 15/00 | (2006.01) |
| C03C 27/00 | (2006.01) |
| C03B 33/09 | (2006.01) |
| H04N 5/225 | (2006.01) |
| C03C 17/00 | (2006.01) |

(52) U.S. Cl.
CPC ............ *C03C 15/00* (2013.01); *C03C 17/002* (2013.01); *H04N 5/2254* (2013.01); *C03C 2218/34* (2013.01)

(58) Field of Classification Search
CPC .................................. C03C 15/00; G02B 3/08
See application file for complete search history.

(56) References Cited

U.S. PATENT DOCUMENTS

| 4,797,316 A | * | 1/1989 | Hecq | ....................... C03C 15/00 |
| | | | | 204/192.37 |
| 5,278,028 A | * | 1/1994 | Hadimioglu | ............. G02B 3/08 |
| | | | | 216/26 |

(Continued)

FOREIGN PATENT DOCUMENTS

KR        101570658 B1    11/2015

OTHER PUBLICATIONS

Takeharu (JP 2008-276059)—English languag human translation.*

(Continued)

*Primary Examiner* — Jason L Lazorcik
(74) *Attorney, Agent, or Firm* — Mendelsohn Dunleavy, P.C.

(57) ABSTRACT

The present invention relates to a manufacturing method for a camera window and a camera window manufactured thereby. A conventional camera window is configured such that an etching pattern is provided on a back surface of a glass sheet, and a deposition layer is provided on the etching pattern, thereby improving reflectivity, whereby indirect external recognition of the etching pattern is performed, but in the present invention, a distinctive pattern is provided on a front surface of a glass sheet such that direct external recognition of the pattern is possible, whereby it is possible to recognize a distinctive pattern line.

5 Claims, 3 Drawing Sheets
(2 of 3 Drawing Sheet(s) Filed in Color)

(56) References Cited

U.S. PATENT DOCUMENTS

| | | | | |
|---|---|---|---|---|
| 2002/0019305 | A1* | 2/2002 | Wu | C03C 3/093 501/56 |
| 2005/0170495 | A1* | 8/2005 | Oldham | B01L 7/52 435/287.2 |
| 2006/0079094 | A1* | 4/2006 | Schreder | C03C 15/00 438/712 |
| 2008/0191463 | A1* | 8/2008 | Vermeulen | G02B 3/08 283/110 |
| 2008/0248267 | A1* | 10/2008 | Taylor | G02B 3/08 428/210 |
| 2012/0135177 | A1* | 5/2012 | Cornejo | B26F 3/002 428/43 |
| 2013/0071601 | A1* | 3/2013 | Bibl | B32B 3/02 428/67 |
| 2013/0295333 | A1* | 11/2013 | Kim | G06F 3/041 428/157 |
| 2013/0323468 | A1* | 12/2013 | Myers | C03C 17/007 428/143 |
| 2014/0285891 | A1* | 9/2014 | Heitzmann | B29D 11/00769 359/571 |
| 2015/0191391 | A1* | 7/2015 | Sinapi | C03C 15/00 428/156 |
| 2016/0016845 | A1 | 1/2016 | Cho et al. | |
| 2016/0219228 | A1 | 7/2016 | Kintz et al. | |
| 2016/0357294 | A1 | 12/2016 | Ozeki et al. | |
| 2017/0003421 | A1* | 1/2017 | Flemming | G02B 3/0012 |

OTHER PUBLICATIONS

Korean Office Action; dated Feb. 27, 2017 for KR Application No. KR 10-2016-0047803.
English translation of previously cited reference: KR101570658.
Non-Final Office Action; dated Feb. 21, 2019 for U.S. Appl. No. 15/865,458.
Park, D.Y., et al. "Camera Window Having Distinctive Pattern," Divisional U.S. Appl. No. 15/865,458, filed Jan. 9, 2018.

* cited by examiner

- AF coating layer
- AR coating layer
- deposition layer
- print layer

MANUFACTURING METHOD FOR CAMERA WINDOW HAVING DISTINCTIVE PATTERN AND CAMERA WINDOW HAVING THE DISTINCTIVE PATTERN

BACKGROUND OF THE INVENTION

Field of the Invention

The present invention relates generally to a manufacturing method for a camera window and a camera window manufactured thereby. More particularly, the present invention relates to a manufacturing method for a camera window and a camera window manufactured thereby, in which a distinctive pattern is formed on a front surface of a glass sheet such that direct external recognition of the pattern is possible, whereby it is possible to recognize a distinctive pattern line without a deposition layer.

Description of the Related Art

Generally, various portable terminals, such as mobile phones, smartphones, tablet PCs, laptops, navigation devices, PDAs, widely utilize a touchscreen display for allowing a user to directly operate the terminal and check the operating state, as well as to check information.

Recently, in response to consumer demand for differentiated designs along with the various functional requirements of portable terminals, many studies have been conducted to improve the design of the cover glass thereof.

The cover glass used in a smartphone, which is currently the most popular of portable terminals, includes: a front cover glass combined with a display window on a display; a rear cover glass combined with a rear surface of the smartphone; a camera window for protecting a camera lens that is generally provided on the rear surface of the smartphone; and a home key button. Research and approaches to improve the design of the smartphone while considering the functionality of each element are ongoing.

Particularly, there has been much interest in improving the design of the front cover glass and the rear cover glass that determine the exterior design of a smartphone. Recently, efforts have been made to improve the design of the camera window and the home key button. In the present invention, the focus is on improving the design of the camera window, and reference will be made thereon.

In general, a camera module in a mobile phone includes: a plurality of lenses for providing high-resolution image-capturing performance; and a barrel for receiving and fixing the lenses, wherein the camera window is disposed at a front end of an objective lens of the camera module to protect the camera module from external impact.

The camera window is made of a shock resistant material that protects the camera module from external impact and has high light transmission, wherein in terms of configuration, an antistatic coating, an AR coating, and the like are provided. In terms of design of the camera window, a print layer colored with single color (black, white, gold, blue, pink, etc.) is provided around a transparent portion of the camera window except for the transparent portion, or to give a pattern texture, two print layers, namely a base print layer and a pattern print layer that is formed after the base print layer, are provided.

The above described print layer using ink has been applied to relatively low-cost models. To meet the diverse needs of consumers and for application to more advanced models, instead of the print layer using ink, aesthetic variety can be provided by deposition of metallic materials and reinforced printing, or a pattern texture can be provided by deposition of metal materials and reinforced printing by using a patterned mask, thereby being applied to high-end models.

Despite improvements in design factors by such processes as deposition and reinforced printing, as consumer demand for novel designs and high-end models increases, predetermined three-dimensional etching patterns are recently being formed on the back surface of a glass substrate, which is used as a camera window material, by using an etching process, and a deposition layer and a print layer are formed on the front surface of the etching pattern to improve reflectivity, such that a pattern texture is given to the front surface of the glass substrate.

However, the above mentioned method is performed to provide a pattern on the back surface of the glass substrate and to allow the pattern to be recognized through the front of the glass substrate, and requires a deposition layer on the back surface of the glass substrate to give a pattern texture to the front surface of the glass substrate. This deposition layer is disadvantageous in that it results in an increase in the process cost and makes the entire process complicated.

Further, the ink in the print layer formed on an upper portion of the deposition layer is highly likely to encroach on the etching pattern, and thereby the intended pattern texture may not be provided, the three-dimensional effect of the pattern may be reduced, or it may be difficult to realize various and complex patterns.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a manufacturing method for a distinctively patterned camera window and a camera window having the distinctive pattern, in which a distinctive pattern is formed on a front surface of a glass sheet such that direct external recognition of the pattern is possible, whereby it is possible to recognize a distinctive pattern line without a deposition layer.

In order to achieve the above object, according to one aspect of the present invention, there is provided a manufacturing method for a camera window having a distinctive pattern and a camera window having the distinctive pattern, in which the camera window is provided with a transmission portion at a center thereof, and a pattern is provided around the transmission portion, the manufacturing method including: forming a cell-based patterning mask layer on a front surface or on front and back surfaces of a glass sheet; forming a cell-based pattern layer on the glass sheet by patterning the patterning mask layer; forming a cell-based distinctive pattern on the front surface of the glass sheet by an etching process using the pattern layer as a mask; removing the patterning mask layer, and forming a shaping mask layer on the front and back surfaces of the glass sheet having the distinctive pattern; patterning the shaping mask layer, and shaping the glass sheet having the distinctive pattern on a cell-by-cell basis; removing the shaping mask layer, and tempering the glass sheet having the distinctive pattern; forming a cell-based functional layer on the back surface or on the front and back surfaces of the glass sheet having the distinctive pattern; and forming a camera window by separating the glass sheet having the distinctive pattern into cells.

Further, it is preferred that the forming of the cell-based distinctive pattern on the front surface of the glass sheet by the etching process is performed such that either a wet etching process or a dry etching process is performed once or multiple times, or the two etching processes are sequentially performed.

Herein, it is preferred that when the wet or dry etching process is performed multiple times or the two etching processes are sequentially performed, each etching process forms a different distinctive pattern, and the dry etching process is performed by a sand blasting process.

Further, it is preferred that the shaping of the glass sheet having the distinctive pattern on the cell-by-cell basis is performed by a laser process, and the laser process forms a cell-based crack cut after or while shaping the glass sheet having the distinctive pattern on the cell-by-cell basis.

Herein, it is preferred that after forming the crack cut, the glass sheet with the crack cut is formed with a chamfer based on a line of the crack cut by wet etching, and further, it is preferred that the tempering of the glass sheet having the distinctive pattern is performed to simultaneously temper a side surface of the glass sheet via the crack cut.

Further, it is preferred that the forming of the functional layer includes forming a cell-based print layer on the back surface of the glass sheet having the distinctive pattern except the transmission portion, and forming an AR coating layer on the transmission portion of the back surface of the glass sheet, and after forming the AR coating layer on the transmission portion, an AF coating layer is formed on the front surface of the glass sheet having the distinctive pattern.

Further, it is preferred that the forming of the camera window by separating the glass sheet having the distinctive pattern by cells is performed by using a laser.

According to the present invention having the above-described characteristics, it is possible to allow a distinctive pattern line to be recognized by providing a camera window that is configured such that the distinctive pattern is formed on the front surface of the glass sheet to enable direct external recognition of the pattern when compared to a conventional method where an etching pattern is provided on a back surface of a glass sheet, and a deposition layer is provided on the etching pattern, thereby improving reflectivity, whereby indirect external recognition of the etching pattern is ensured.

Further, the present invention is advantageous in that since the distinctive pattern is formed on the front surface of the glass sheet, a forming process of a deposition layer is not required, which is conventionally formed on top of the etching pattern on the back surface of the glass sheet, it is possible to make the entire process simple, and is possible to reduce process cost.

The present invention is further advantageous in that since the distinctive pattern is formed on the front surface of the glass sheet, and the functional layer is formed on the back surface of the glass sheet, that is, the distinctive pattern and the functional layer are respectively formed on opposite surfaces of the glass sheet, encroachment of the distinctive pattern by forming the functional layer is minimized, so it is possible to improve visibility of the distinctive pattern, giving an intended pattern texture.

The present invention is further advantageous in that since the glass sheet is entirely processed in a state of the sheet, and the camera window is finally provided by separating the glass sheet into cells, process efficiency is excellent.

BRIEF DESCRIPTION OF THE DRAWINGS

The application file contains at least one drawing executed in color. Copies of this patent application publication with color drawings will be provided by the Office upon request and payment of the necessary fee.

The above and other objects, features and other advantages of the present invention will be more clearly understood from the following detailed description when taken in conjunction with the accompanying drawings, in which.

DETAILED DESCRIPTION OF THE INVENTION

The present invention relates to a manufacturing method for camera window and a camera window manufactured thereby. A conventional camera window is configured such that a back surface of a glass sheet is provided with an etching pattern, and a deposition layer is provided on the etching pattern, thereby improving reflectivity, whereby indirect external recognition of the etching pattern is ensured, but the present invention is configured such that a front surface of a glass sheet is provided with a distinctive pattern, so direct external recognition of the pattern is possible, whereby it is possible to recognize a distinctive pattern line.

Further, since the present invention is configured such that the front surface of the glass sheet is provided with the distinctive pattern, a forming process of a deposition layer is not required, which is conventionally required to improve an external recognition pattern texture of the etching pattern formed on the back surface of the conventional glass sheet, so it is possible to make the entire process simple, and is possible to reduce process cost.

Further, the present invention is configured such that the distinctive pattern is formed on the front surface of the glass sheet, and a functional layer is formed on a back surface of the glass sheet, that is, the distinctive pattern and the functional layer are respectively formed on opposite surfaces of the glass sheet, whereby encroachment of the distinctive pattern by forming the functional layer is minimized, so it is possible to improve visual visibility of the distinctive pattern, giving an intended pattern texture, thereby improving aesthetics of the device to a user.

Hereinbelow, an exemplary embodiment of the present invention will be described in detail with reference to the accompanying drawings.

Figure 1:
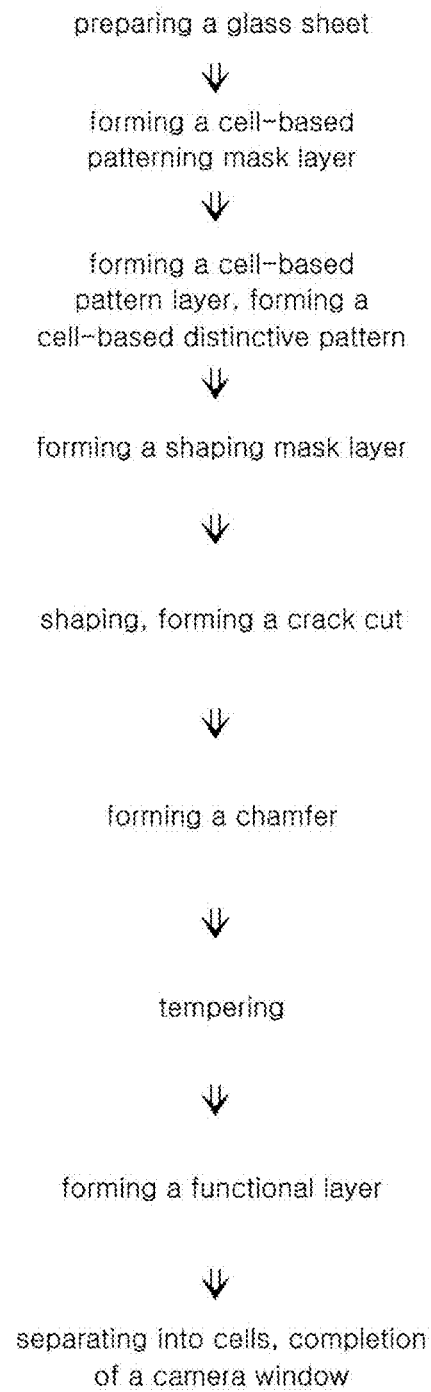
FIG. 1 is a diagram showing a manufacturing method for a camera window having a distinctive pattern according to an embodiment of the present invention.
Figure 1:
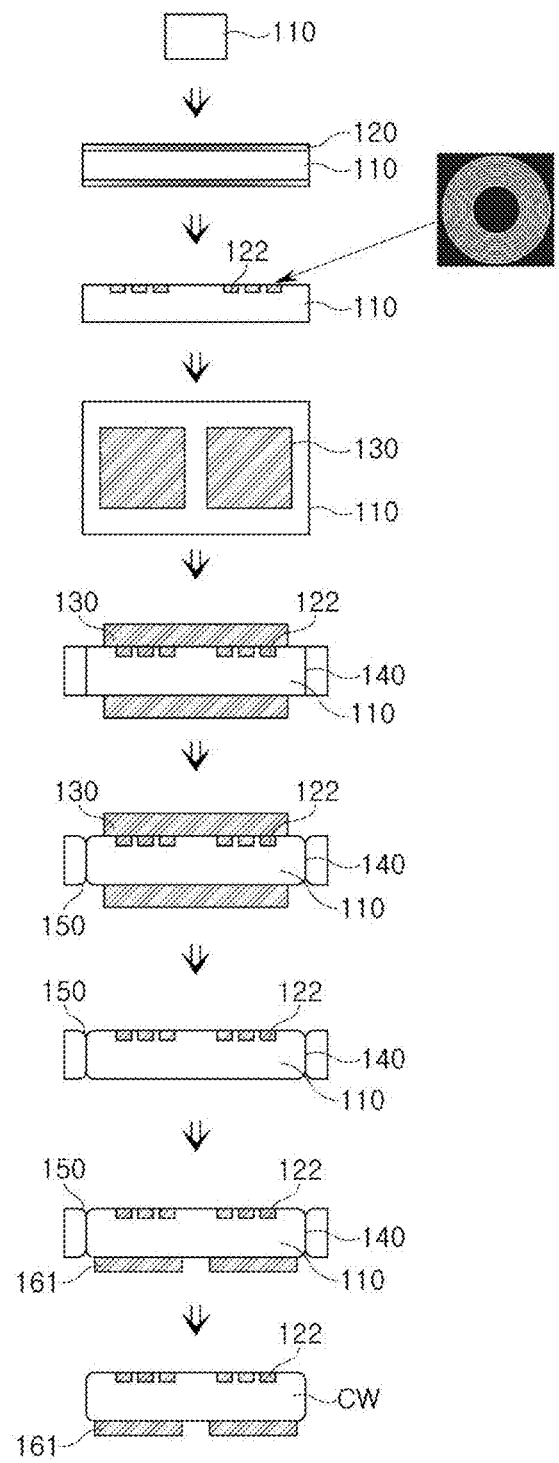

FIG. 1 is a diagram showing a manufacturing method for a camera window having a distinctive pattern according to an embodiment of the present invention. As shown in the drawing, a manufacturing method for a camera window having a distinctive pattern 122 according to an embodiment of the present invention, in which the camera window is provided with a transmission portion at a center thereof, and a pattern is provided around the transmission portion, includes: forming a cell-based patterning mask layer 120 on a front surface or on front and back surfaces of a glass sheet 110; forming a cell-based pattern layer on the glass sheet 110 by patterning the patterning mask layer; forming a cell-based distinctive pattern 122 on the front surface of the glass sheet 110 by an etching process using the pattern layer as a mask; removing the patterning mask layer, and forming a shaping mask layer 130 on the front and back surfaces of the glass sheet 110 having the distinctive pattern 122; patterning the shaping mask layer 130, and shaping the glass sheet 110 having the distinctive pattern 122 on a cell-by-cell basis; removing the shaping mask layer 130, and tempering the glass sheet 110 having the distinctive pattern 122; forming a cell-based functional layer on the back surface or on the front and back surfaces of the glass sheet 110 having the distinctive pattern 122; and forming a camera window CW by separating the glass sheet 110 having the distinctive pattern 122 into cells.

The camera window according to the present invention is provided for protecting a camera module from external impact by being disposed at a front end of an objective lens of a camera module of a mobile terminal, such as a smartphone, and is generally provided with the transmission portion at the center thereof for allowing light to pass therethrough, wherein a predetermined pattern is provided around the transmission portion, thereby giving a pattern texture to a user, and it is possible to increase the aesthetics of mobile device.

The camera window is made of a shock resistant material, such as tempered glass, that protects the camera module from external impact and has high light transmission, and the front surface or the back surface of the camera window may be provided with the functional layer, such as an antistatic coating layer, an AR coating layer, an AF coating layer, a color layer according to a color of a mobile terminal, and a reinforced print layer.

According to the embodiment of the present invention, the glass sheet 110 is prepared, and the cell-based patterning mask layer 120 is formed on the front surface or on the front and back surfaces of the glass sheet 110.

Herein, the surface of the glass sheet 110 is inspected for scratches or foreign substances, and the glass sheet is made of a commonly used glass, such as a transparent soda lime glass or an alumino-silicate glass is used.

Tempered or untempered glass may be used for the glass sheet 110, and the cell-based patterning mask layer 120 is formed on the front surface or on the front and back surfaces of the glass sheet 110.

The cell-based patterning mask layer 120 is provided to form a pattern on the glass sheet 110 on a cell-by-cell basis, that is, to form the distinctive pattern 122 according to the present invention, and the patterning mask layer is formed as follows: a photosensitive coating layer is coated on the front surface or on the front and back surfaces of the glass sheet 110, for example, a photoresist is coated or a DFR (dry film resist) is laminated, and the cell-based pattern layer is formed on the glass sheet 110 by a patterning process for exposing and developing the photoresist or the DFR.

In other words, to form the distinctive pattern 122 on the glass sheet, the cell-based patterning mask layer 120 is coated or laminated on the front surface or on the front and back surfaces of the glass sheet 110, and the cell-based pattern layer is formed on the glass sheet 110 by the patterning process for exposure and development.

Herein, the cell-based pattern layer formed on the glass sheet 110 is preferably formed on the front surface of the glass sheet 110 since the distinctive pattern 122 according to the present invention is formed on the front surface of the glass sheet 110.

However, an additional pattern may be formed on the back surface of the glass sheet 110 to induce a three-dimensional interference pattern for the distinctive pattern 122, and a pattern different from the distinctive pattern 122 may be formed.

The cell-based pattern layer on the glass sheet 110 may have various patterns, such as multiple spin patterns, multiple spiral patterns, multiple dot patterns, and the like, each of which has the transparent portion of the camera window CW as a concentric circle, and is formed considering a shape of the distinctive pattern 122 completed by the present invention.

Further, a cell-based distinctive pattern 122 is formed on the front surface of the glass sheet 110 by an etching process using the cell-based pattern layer formed on the glass sheet 110 as a mask. FIG. 1 is a view showing the distinctive pattern formed on one cell of the glass sheet.

In other words, the pattern layer is formed on the front surface of the glass sheet 110 on a cell-by-cell basis, which is used as an etch mask, and the cell-based distinctive pattern 122 is formed on the front surface of the glass sheet 110.

Herein, the etching process is performed such that either a wet etching process or a dry etching process is performed once or multiple times, or the two etching processes are sequentially performed, according to an intended shape of the distinctive pattern.

The wet etching process is performed by a conventional glass wet etching process. For example, the wet etching process may be performed by exposing to an etching solution including HF for a predetermined time, and the dry etching process may be performed by a sand blasting process.

When the wet or dry etching process is performed multiple times or the two etching processes are sequentially performed, each etching process may form a different distinctive pattern.

In other words, after the patterning process is performed by using the cell-based patterning mask layer 120 with both a spin pattern formed by the wet etching process and a different pattern formed on top of the spin pattern, the wet etching process may be performed once again, or the dry etching process may be performed sequentially.

Thereby, fine patterns of various shapes and sizes such as nano-size and micro-size can be made, so it is possible to realize a distinctive pattern 122, in which various pattern textures are given, and in some cases, it is possible to improve aesthetics and complement the functional aspects of the camera window.

The camera window CW according to the present invention is configured such that the distinctive pattern 122 is provided on the front surface of the glass sheet 110, so the predetermined distinctive pattern 122 is exposed to the outside of the portable terminal, whereby direct external recognition of the pattern is possible.

When compared to the conventional method where an etching pattern is provided on a back surface of a glass sheet, and a deposition layer is provided on the etching pattern, thereby improving reflectivity, indirect external recognition of the etching pattern is performed, the present invention is configured to allow a distinctive pattern line to be recognized through direct external recognition of the distinctive pattern 122.

Further, by forming the distinctive pattern 122 on the front surface of the glass sheet 110, the forming process of the deposition layer is not required, which is conventionally required to improve an external recognition pattern texture of the etching pattern formed on the back surface of the conventional glass sheet, so it is possible to make the entire process simple, and is possible to reduce process cost.

By forming the distinctive pattern 122, it is possible to improve processing yield by processing the glass sheet on a cell-by-cell basis.

Then, after forming the cell-based distinctive pattern 122 on the front surface of the glass sheet 110 by the etching process, the patterning mask layer is removed, and the shaping mask layer 130 is formed on the front and back surfaces of the glass sheet 110 having the distinctive pattern 122.

Further, by patterning the shaping mask layer 130, the glass sheet 110 having the distinctive pattern 122 is shaped on a cell-by-cell basis. FIG. 1 is a diagram showing the shaping mask layer 130 that is patterned and formed on two cells of the glass sheet 110.

The shaping of the glass sheet 110 on a cell-by-cell basis is performed by a laser process, and the glass sheet may be processed into a predetermined shape according to the specifications of a mobile terminal, such as a smartphone.

Herein, the laser process performed in the shaping step may be performed to form a cell-based crack cut 140 through a separate process after or while shaping the glass sheet 110 having the distinctive pattern 122 on a cell-by-cell basis or shaping the same according to the shape of the camera window CW.

The crack cut 140 does not completely separate the glass sheet 110 which remains attached at least one portion. As a whole, the crack cut is provided in a sheet unit, but in part, the crack cut is provided by being shape processed in a cell unit.

Further, after forming the crack cut 140, the glass sheet 110 with the crack cut 140 may be formed with a chamfer 150 based on a line of the crack cut 140 by a wet etching process.

The chamfer 150 is formed by a wet etching process, and the wet etching process is performed by exposing the glass sheet 110 with the shaping mask layer 130 to an etching solution including HF for five seconds to 10 minutes at a temperature of 20° C. to 30° C., and based on the line of the crack cut, namely between the shaping mask layer 130, the chamfer 150 is formed.

In forming the chamfer 150 by the wet etching process, a micro crack may occur in the cutting face due to the laser process or the shaping process of the crack cut 140, so if the laser cutting portion is etched chemically, the micro crack can be smoothly formed, thereby enhancing the side surface.

Then, the shaping mask layer 130 is removed, and the glass sheet 110 having the distinctive pattern 122 is tempered. In the case where the above processes are performed by using the tempered glass sheet (first tempering treatment) 110, an additional tempering (second tempering treatment) is performed by this process.

This process is performed to additionally temper a portion of the firstly tempered glass that is deteriorated by the forming the distinctive pattern 122 or by the laser process. To be more specific, chemical tempering is performed at a temperature of 350° C. to 450° C. by using potassium nitrate (KNO3), and the glass sheet 110 is cooled gradually to prevent cracking, and then the glass sheet 110 is washed.

This tempering process is performed to temper the front surface and the back surface of the glass sheet 110 shaped on a cell-by-cell basis using a laser, and when the crack cut 140 is formed, the side surface of the glass sheet 110 is simultaneously tempered via the crack cut 140.

In other words, the glass sheet 110 shaped on a cell-by-cell basis is in a state of a sheet, and other than the front surface and the back surface of the glass sheet 110, the side surface of the glass sheet 110 is also tempered via the crack cut 140.

The above tempering process is performed in a state where the glass sheet is maintained, so production yield is higher than that in the cell-by-cell process, and it is possible to improve durability by simultaneously tempering a side surface as a cutting face.

Further, the cell-based functional layer is formed on the back surface of the glass sheet 110 having the distinctive pattern 122. The functional layer is provided for complementing the function of the camera window CW, and may be provided by the following manner: a cell-based print layer 161 is formed on the back surface of the glass sheet 110 having the distinctive pattern 122 except the transmission portion; and an AR coating layer is formed on the transmission portion of the back surface of the glass sheet 110.

In other words, the present invention is configured such that the front surface of the glass sheet 110 is formed with the distinctive pattern 122 to give a pattern texture from the outside, the back surface of the glass sheet 110 is formed with the functional layer, that is, the distinctive pattern 122 and the functional layer are respectively formed on opposite surfaces of the glass sheet 110, whereby encroachment of the distinctive pattern 122 by forming the functional layer is minimized, so it is possible to improve visual visibility of the distinctive pattern 122, giving an intended pattern texture.

Further, after forming the AR coating layer on the transmission portion, an AF coating layer may be formed on the front surface of the glass sheet 110 having the distinctive pattern 122. Herein, the AF coating layer is realized by the distinctive pattern 122 being exposed to the front surface of the glass sheet 110, so the distinctive pattern 122 may perform a function of the AF coating layer according to the shape of the distinctive pattern 122, and thus, the AF coating layer may be omitted or formed to complement the distinctive pattern.

Further, the functional layer may be selectively realized in the form of an antistatic coating layer, the AF coating layer, a dehumidifying layer, a color layer, a reinforced print layer on the front surface or the back surface of the glass sheet 110, according to the specifications of a mobile terminal.

Further, after forming the cell-based functional layer on the back surface of the glass sheet 110, the camera window CW is formed by separating the glass sheet 110 having the distinctive pattern 122 into cells.

As described above, since the glass sheet 110 is provided in the state of the glass sheet 110 after being shape-processed by the laser process on the cell-by-cell basis or after forming the crack cut 140, the final camera window CW is provided by separating the glass sheet into cells.

Herein, in separating the glass sheet into cells, a laser may be used, and the crack cut is completely cut such that the camera window CW that is shape-processed on a cell-by-cell basis is separated from the glass sheet.

Figure 2A:
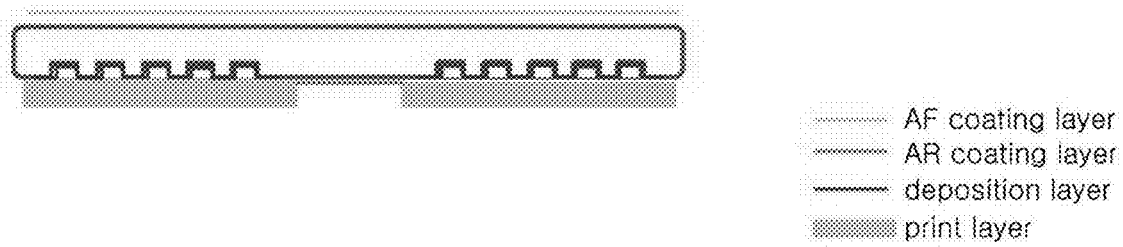
FIG. 2A is a sectional diagram showing a conventional camera window.

FIG. 2A is a sectional diagram showing a conventional camera window that is configured such that an etching pattern is formed on the back surface of the conventional glass substrate, a deposition layer is formed on top of the etching pattern, a print layer 161 is formed around a transmission portion over the deposition layer, an AR coating layer is formed on the transmission portion, and the AF coating layer is formed on the front surface of the glass substrate.

Figure 2B:
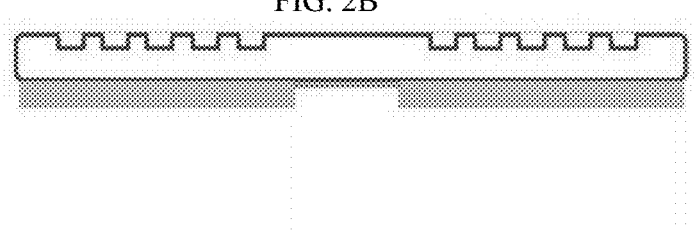
FIG. 2B is a sectional diagram showing a camera window according to the embodiment of the present invention.

FIG. 2B is a sectional diagram showing a camera window according to the embodiment of the present invention, wherein the camera window is configured such that the distinctive pattern 122 is formed on the front surface of the glass sheet, the print layer 161 is formed on the back surface of the glass sheet except the transmission portion, and the AR coating layer is formed on the transmission portion, whereby the forming process of the deposition layer is not required, which the conventional camera window requires, and in some cases, the AF coating layer may be not required on the front surface, so it is possible to make the entire process dramatically simple, and is possible to reduce process cost.

Figure 3A:
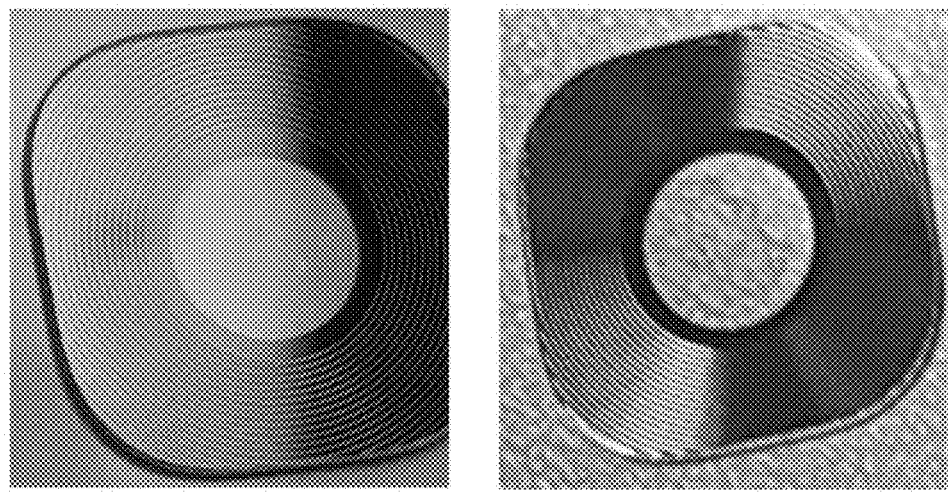
FIG. 3A is a photograph of the conventional camera window.
Figure 3B:
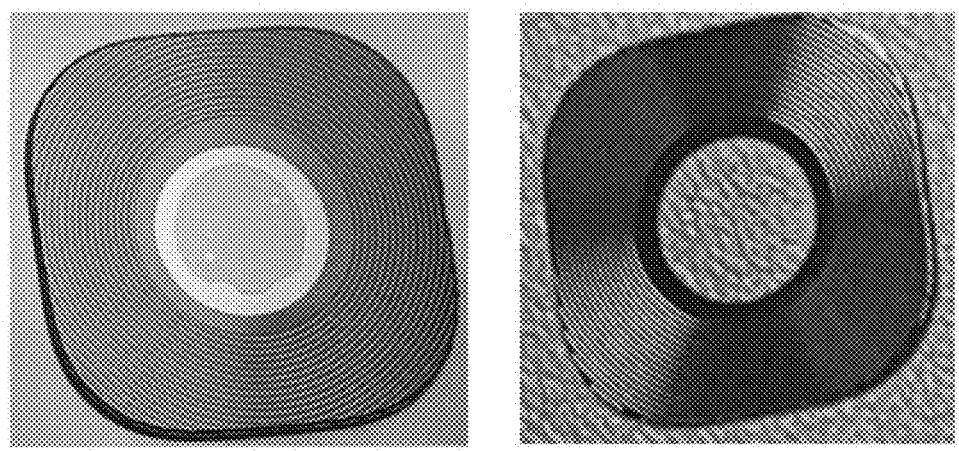
FIG. 3B is a photograph of the camera window according to the embodiment of the present invention.

FIG. 3A is a photograph of the conventional camera window, and FIG. 3B is a photograph of the camera window according to the embodiment of the present invention. The two photographs allow the pattern texture to be recognized, and a pattern line of the camera window according to the embodiment of the present invention is more distinctive.

As described above, the present invention is advantageous in that the glass sheet is entirely processed in sheet state, and the camera window is finally provided by separating the glass sheet into cells, whereby process efficiency is excellent, and the distinctive pattern is formed on the front surface of the glass sheet, whereby the forming process of the deposition layer is not required, which is conventionally required to improve a pattern texture, thereby making the manufacturing process simple, and the functional layer is formed on the back surface of the glass sheet, which is a surface opposite to the distinctive pattern, whereby encroachment of the distinctive pattern is minimized, so it is possible to improve visibility of the distinctive pattern, giving an intended pattern texture, thereby improving aesthetics of the device.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of manufacturing a camera window for use in protecting a camera module having an objective lens from external impact, said camera window having a distinctive pattern recognizable by direct external recognition, in which the camera window is provided with a transmission portion at a center thereof, and a pattern is provided around the transmission portion, and wherein the camera window has a front surface and a back surface which are opposite surfaces, the manufacturing method comprising:

forming a cell-based patterning mask layer on a front surface or on the front surface and a back surface of a glass sheet;

forming a cell-based pattern layer on the glass sheet by patterning the patterning mask layer;

forming a cell-based distinctive pattern on the front surface of the glass sheet by etching the front surface of the glass sheet using the pattern layer as a mask;

removing the patterning mask layer, and forming a shaping mask layer on the front and back surfaces of the glass sheet having the distinctive pattern;

patterning the shaping mask layer, and shaping the glass sheet having the distinctive pattern on a cell-by-cell basis, wherein the step of shaping the glass sheet having the distinctive pattern on the cell-by-cell basis is performed by a laser process, and the laser process forms a cell-based crack cut after or while shaping the glass sheet having the distinctive pattern on the cell-by-cell basis;

wet etching on a line of the crack cut on the glass sheet while the shaping mask layer is still on the glass sheet to form a chamfer in the glass sheet through the shaping mask layer;

removing the shaping mask layer, and tempering the glass sheet having the distinctive pattern while simultaneously tempering a side surface of the glass sheet via the crack cut;

forming a cell-based functional layer on the back surface of the glass sheet having the distinctive pattern, wherein the step of forming the functional layer includes: forming a cell-based print layer on the back surface of the glass sheet having the distinctive pattern except the transmission portion; and forming a camera window by separating the glass sheet having the distinctive pattern into cells, wherein the forming the cell-based distinctive pattern on the front surface of the glass sheet by the etching process is performed such that either a wet etching process or a dry etching process is performed once or multiple times, or the two etching processes are sequentially performed, and each etching process forms the same or a different distinctive pattern.

2. The manufacturing method of claim 1, wherein the dry etching process is performed by a sand blasting process.

3. The manufacturing method of claim 1, wherein the step of forming the functional layer includes:

forming an AR coating layer on the transmission portion of the back surface of the glass sheet.

4. The manufacturing method of claim 3, wherein after forming the AR coating layer on the transmission portion, an AF coating layer is formed on the front surface of the glass sheet having the distinctive pattern.

5. The manufacturing method of claim 1, wherein the step of forming the camera window by separating the glass sheet having the distinctive pattern by cells is performed by using a laser.

\* \* \* \* \*